US008922656B2

(12) United States Patent
Quinn et al.

(10) Patent No.: US 8,922,656 B2
(45) Date of Patent: Dec. 30, 2014

(54) USB VIDEO INTERFACE FOR ALPR CAMERAS AND ASSOCIATED METHOD

(75) Inventors: Alan Quinn, Longwood, FL (US); Tharaka Goonetilleke, Kissimmee, FL (US)

(73) Assignee: NDI Technologies, Inc., Winter Springs, FL (US)

( * ) Notice: Subject to any disclaimer, the term of this patent is extended or adjusted under 35 U.S.C. 154(b) by 210 days.

(21) Appl. No.: 13/636,475

(22) PCT Filed: Jun. 14, 2011

(86) PCT No.: PCT/US2011/040243
§ 371 (c)(1),
(2), (4) Date: Sep. 21, 2012

(87) PCT Pub. No.: WO2011/159636
PCT Pub. Date: Dec. 22, 2011

(65) Prior Publication Data
US 2013/0076903 A1    Mar. 28, 2013

Related U.S. Application Data

(60) Provisional application No. 61/355,192, filed on Jun. 16, 2010.

(51) Int. Cl.
*H04N 7/18* (2006.01)
*G06K 9/00* (2006.01)
*H04N 5/77* (2006.01)

(52) U.S. Cl.
CPC ............ *H04N 7/181* (2013.01); *G06K 9/00973* (2013.01); *H04N 5/772* (2013.01); *G06K 2209/15* (2013.01)
USPC ........................................................ 348/148

(58) Field of Classification Search
CPC   G06K 9/00973; G06K 2209/15; H04N 7/181

USPC .......................................................... 348/148
See application file for complete search history.

(56) References Cited

U.S. PATENT DOCUMENTS 5,748,234 A    5/1998  Lippincott
5,809,161 A    9/1998  Auty et al.
(Continued)

FOREIGN PATENT DOCUMENTS

EP         0585916        3/1994

OTHER PUBLICATIONS

PCT International Search Report dated Feb. 9, 2012 for Application No. PCT/US2011/040243—entire document.

*Primary Examiner* — Jay Au Patel
*Assistant Examiner* — Francis G Geroleo
(74) *Attorney, Agent, or Firm* — Allen, Dyer, Doppelt, Milbrath & Gilchrist (57) ABSTRACT

A video processing system (10) for automatic license plate recognition (ALPR) provides an interface between video cameras (14, 16) and a host computer (20) through a single high speed USB connection (18). The system (10) supports four simultaneous composite video channels (28A, 28B, 28C, 28D) with two channels dedicated to an IR monochrome video and two channels dedicated to color video. Compression software incorporates a high speed memory for buffering and stripping unnecessary data from a digitized data stream. Monochrome channel data and color channel data are marked with an incrementing index to tag them with frame identification. As a result, processing software in the host computer can re-align the monochrome and color video information after processing a license plate image, regardless of the order of data arrival. Color overview and monochrome recognition images are provided at the same time, and thus show the same plate or vehicle.

29 Claims, 8 Drawing Sheets

(56) References Cited

U.S. PATENT DOCUMENTS

| | | |
|---|---|---|
| 6,549,958 B1 | 4/2003 | Kuba |
| 6,970,102 B2 | 11/2005 | Ciolli |
| 7,630,515 B2 | 12/2009 | Takahashi et al. |
| 7,640,083 B2 | 12/2009 | Monroe |
| 7,711,150 B2 | 5/2010 | Simon |
| 7,768,548 B2 | 8/2010 | Silvernail et al. |
| 2004/0033052 A1* | 2/2004 | Lim et al. ............... 386/46 |
| 2006/0123166 A1* | 6/2006 | Toebes et al. ............... 710/106 |
| 2006/0164258 A1 | 7/2006 | Garibotto et al. |
| 2007/0201815 A1 | 8/2007 | Griffin |
| 2008/0175479 A1 | 7/2008 | Sefton et al. |
| 2009/0202105 A1 | 8/2009 | Castro Abrantes et al. |
| 2009/0207046 A1 | 8/2009 | Arrighettie |
| 2010/0185362 A1 | 7/2010 | Vialatte et al. |
| 2011/0013018 A1 | 1/2011 | Leblond |
| 2011/0229105 A1* | 9/2011 | Khan et al. ............... 386/200 |

\* cited by examiner

A. AVID RISING EDGE OCCURS FOUR SCLK CYCLES EARLY WHEN IN THE ITU-R BT.656 OUTPUT MODE.

FIG. 3A

A. LINE NUMBERING CONFORMS TO ITU-R BT.470 AND ITU-R BT.1700.

| PIN | DESCRIPTION |
|---|---|
| A | COLOR CAMERA VIDEO RETURN |
| B | COLOR CAMERA VIDEO |
| C | GND |
| D | RS232 RX |
| E | CAMERA POWER RETURN |
| F | GND |
| G | CAMERA POWER 12V DC |
| H | SHIELD |
| J | IR CAMERA VIDEO RETURN |
| K | IR CAMERA VIDEO |
| L | RS232 TX |
| M | GND |

<u>TABLE 1</u>

FIG. 11

USB VIDEO INTERFACE FOR ALPR CAMERAS AND ASSOCIATED METHOD

CROSS-REFERENCE TO RELATED APPLICATIONS

This application claims the benefit of U.S. Provisional Application No. 61/355,192, filed Jun. 16, 2010, the disclosure of which is hereby incorporated by reference herein in its entireties all commonly owned.

FIELD OF INVENTION

The present invention generally relates to a video signal processing system and method for interfacing video cameras with computers and, in particular to a USB frame grabber supporting multiple composite video channels in an automatic license plate recognition (ALPR) system.

BACKGROUND

It is well known to input video data into a computer system. As indicated in US Patent Application Publication US 20012/0043282 for Hu, video capture chips are used for capturing still image or live video, and may be used together with a video sensor and signal processing circuit to form a video camera. While it is desirable to include a USB interface in the video capture chip to interface with a computer, the typical USB interface has a much smaller signal bandwidth capacity than the camera generates.

USB video capture devices are also well known for converting analog video signals to digital signals as a bridge between the PC and the camera. However, typical video capture devices process only a single signal. While in development, at present, a USB interface has a bandwidth of about 480 MB per second. It is anticipated that future devices will have 4.8 MB per second allocated to a single channel. In order to capture live video at a high resolution, the image data may be compressed using an intermediate buffer for compression of video data, but such a process as typically performed is undesirably costly. USB video capture devices including software for converting analog video signals to digital signals are also well known for inputting video data into a PC. As addressed by Hu, it is desirable to have a method and system for capturing video images with improved efficiency and reduced hardware costs.

It is also desirable to be available to process multiple signals. By way of further example, it will be useful to be able to provide input from multiple cameras to a single USB port at a high frame rate, and do so without the need for external signal processing.

SUMMARY

The present invention is generally directed to automatic license plate recognition (ALPR) systems and in particular to video signal processing and systems for interfacing video cameras with computers. One embodiment of the invention includes a USB interface frame grabber, herein described as a video signal processing system, that supports four simultaneous composite video channels (in this case from two cameras). Two channels are dedicated to monochrome video (typically IR) and two channels to color video (a standard for the ALPR industry). As will come to the mind of those skilled in the art, once having the benefit of the teachings of the present invention, such video processing for multiple channels not limited to those herein described by way of example will be possible as desired.

As herein described, the interface system supports four video channels through a single high speed USB port by using compression software incorporating a large high speed memory for buffering and stripping down unnecessary data from a digitized data stream. While monochrome and color video signals in each ALPR camera may be synchronized, video data that gets to the computer and processed to identify a license plate, undesirably becomes non-synchronized. The present invention solves this problem by desirably having an infrared image correlate to its related color image. For an embodiment of the present invention, herein described by way of example, the system provides a single USB connection to a host processor and marks the monochrome channel data and the color channel data with an incrementing index to tag them with the same frame identification. As a result, the processing software in the host computer can re-align the monochrome and color video information after processing a license plate image, regardless of the order of data arrival. This will ensure that color overview and the monochrome recognition images are taken at the same time, and show the same plate or vehicle.

One embodiment of the invention includes a USB interface, an interface device herein referred to as a video processing system. Such a system is commercially available as a TG-X200 provided by NDI Technologies, Inc. The TGX-200 device is a USB based frame grabber that supports four simultaneous composite video channels. Each video channel may provide fifty video fields per second of an IR signal, with two channels dedicated for monochrome video and the two channels for color video, a standard for the ALPR industry, and achieves one hundred fields per second for the four channels. The TG-X200 supports the four video channels through a single high speed USB port by using the non-destructive compression software herein described, by way of example. A large high speed memory is included for buffering and stripping down unnecessary data from the digitized data stream.

BRIEF DESCRIPTION OF DRAWINGS

Embodiments of the invention are described by way of example with reference to the accompanying annotated drawings and photographs in which.

DETAILED DESCRIPTION OF EMBODIMENTS

The present invention will now be described more fully hereinafter with reference to the accompanying drawings, in which preferred embodiments of the invention are shown.

Unless otherwise defined, all technical and scientific terms used herein are intended to have the same meaning as commonly understood in the art to which this invention pertains and at the time of its filing. Although various methods and materials similar or equivalent to those described herein can be used in the practice or testing of the present invention, suitable methods and materials are described below. However, those skilled in the art should understand that the methods and materials used and described are examples and may not be the only ones suitable for use in the invention.

Moreover, it should also be understood that any temperature, weight, volume, time interval, range, concentration and any other measurements, quantities or numerical expressions given herein are intended to be approximate and not exact or critical values unless expressly stated to the contrary. Where appropriate to the invention and as understood by those of skill in the art, it is proper to describe the various aspects of the invention using approximate or relative terms and terms of degree commonly employed in patent applications, such as: so dimensioned, about, approximately, substantially, essentially, comprising, and effective amount.

Accordingly, this invention may be embodied in many different forms and should not be construed as limited to the illustrated embodiments set forth herein. Rather, these illustrated embodiments are provided so that this disclosure will be thorough, complete, and will fully convey the scope of the invention to those skilled in the art. Other features and advantages of the invention will be apparent from the following detailed description, and from the claims.

Figure 1:
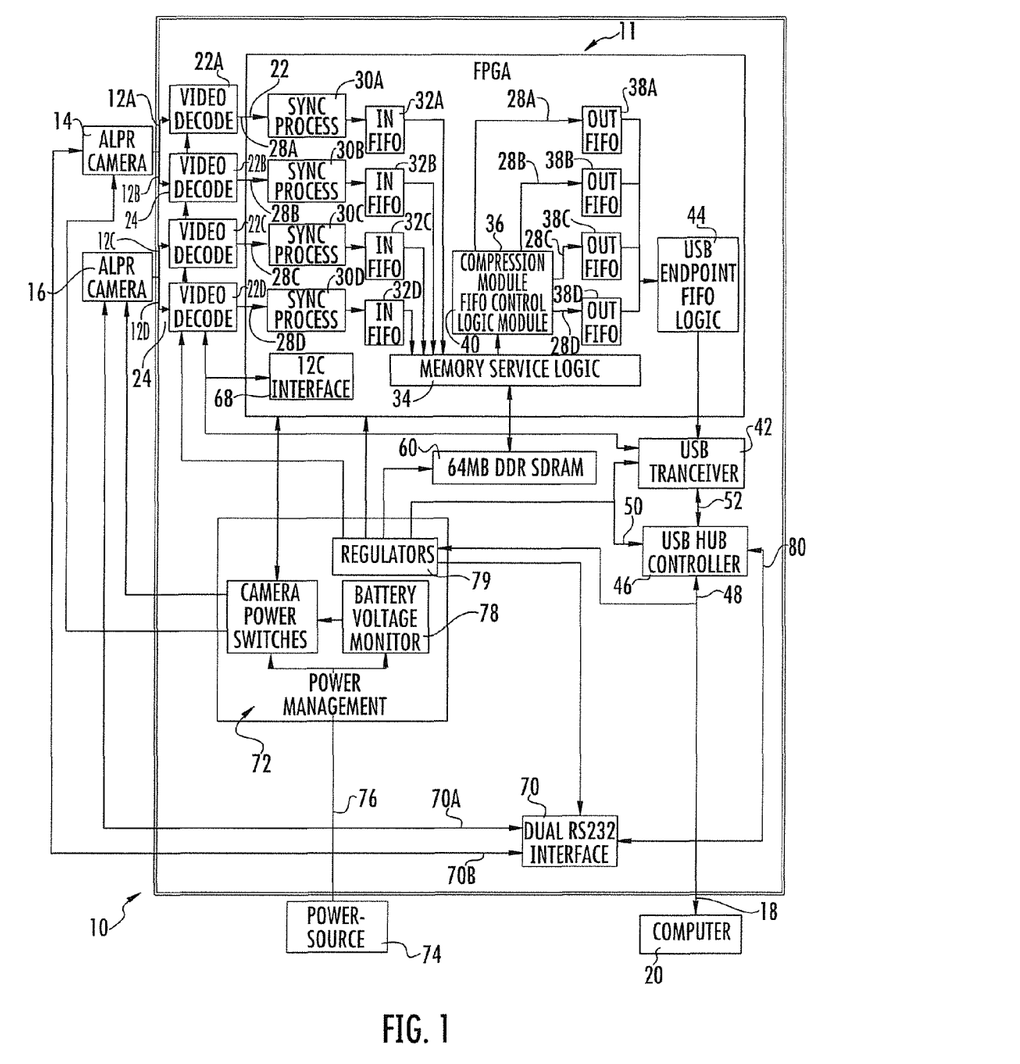
FIG. 1 is a block diagram illustrating one embodiment of the present invention including a self contained interface that accepts four composite video feeds from two ALPR cameras, while powering the ALPR Cameras.

Referring initially to FIG. 1, one embodiment of the invention is herein described by way of example as a video signal processing system (10) for receiving video feeds (12A, 128, 12C, 12D) from automatic license plate recognition (ALPR) cameras (14, 16) and for providing a single USB connection (18) to a host computer (20). The system (10) comprises four video decoders (22A, 22B, 22C, 22D) adapted to accept video signal inputs (20) from the ALPR cameras (14, 16) and convert the video signal inputs (20) into digital component video formatted outputs (22) in video channels (28A, 28B, 28C, 28D) and four sync processor logic modules (30A, 30B, 30C, 30D) communicating with the video channels (28A, 28B, 28C, 28D), wherein input data provided thereby is clocked-in via each video decoder (22A, 22B, 22C, 22D) into a corresponding sync processor logic module (30A, 30B, 30C, 30D), and wherein the sync processor logic modules (30A, 30B, 30C, 30D) extract active video data from a data stream and discard non-active data unnecessary for ALPR applications. There are four input FIFO modules (32A, 32B, 32C, 32D) for each of the video channels (32A, 32B, 32C, 32D), wherein each input FIFO module (32A, 32B, 32C, 32D) is controlled by one of the sync processor logic modules (30A, 30B, 30C, 30D) when the active video data is present. A memory controller (34) receives data from the input FIFO modules (32A, 32B, 32C, 2D).

With continued reference to FIG. 1, four output FIFO modules (38A, 38B, 38C, 38D) are operable for determining if there is sufficient available data storage and operable with the memory controller (34) for providing data for a particular video channel (28A, 28B, 28C, 28D). A compression module (36) receives data from the memory controller (34) for each of the video channels (32A, 32B, 32C, 32D) and includes software for compressing the data sent to the output FIFO modules (38A, 38B, 38C, 38D) for each video channel (32A, 32B, 32C, 32D). The memory controller (34) serves the output FIFO modules (38A, 38B, 38C, 38D) through the compression module (36). A FIFO control logic module (40) is operable with each video channel (32A, 32B, 32C, 32D) and operates to determine if the output FIFO modules (38A, 38B, 38C, 38D) have sufficient storage space for a preselected set of data entries. The compression module (36) compresses the data and transmits resultant compressed data to the output FIFO modules (38A, 38B, 38C, 38D) through the FIFO control logic module (40).

A USB transceiver (42) comprising a microcontroller is operable in a first in, first out (FIFO) mode for an initial configuration and setup of the FIFO output modules (38A, 38B, 38C, 38d). A USB endpoint controller (44) is operable with the USB transceiver (42) for transferring data from the output FIFO modules (38A, 38B, 38C, 38D) to the USB Transceiver (42). The data from the Output FIFO modules (38A, 38B, 38C, 38D) is clocked in and clocked out using the USB transceiver (42) which is operable with the FIFO control logic module (40). As a result, a single high speed USB connector (52) may be connected to the USB transceiver (42) for providing the single USB connection (18) to the host computer (20).

With continued reference to FIG. 1, a USB Hub Controller (46) comprising a two channel USB to Serial converter to allow the USB Transceiver (42) and a USB to Serial interface operable therewith to be on one USB port. The hub controller (46) provides one USB uplink port (48) and two USB downlink ports (50). In addition, a DDR SDRAM module (60) is provided. The memory controller (34) includes DDR memory service logic which transfers data to and from the DDR SDRAM module (60), and the memory controller (34) is operable for receiving data from the Input FIFO modules (32A, 32B, 32C, 32D) and transferring the data to and from the DDR SDRAM module (60).

The system (10) further comprising a serial interface (68) adapted to setup the video decoders (22A, 22B, 22C, 22D) and to adjust characteristics including at least one of hue, brightness, saturation, and sharpness. An RS232 interface (70) communicates with the USB hub controller (46), and as herein described by way of example, includes ports (70A, 70B) for connecting to the two ALPR cameras (14, 16).

With continued reference to FIG. 1, ALPR Camera Power Management electronics (72) is provided for controlling power delivered to the system (10) from a power source (74). A universal serial bus (76) receives power from the power source (74) and for the TG-X200, herein described by way of example, provides a 12V DC supply used to power the ALPR Camera Power Management electronics (72). The 12V DC supply for the cameras is sent through a protection block (78) to guard against over voltage, reverse polarity, transient voltages, and the like.

The system (10) is powered from the USB Bus while a 12V DC supply, generally a cigarette lighter socket of a vehicle used to power the ALPR Camera Power Management electronics (72). The interface between the host computer (20) and the system (10) is the high speed USB 2.0 connection (52). For the TG-X200 herein described by way of example, the system (10) comprises two printed circuit boards (PCB), a main board for components and an auxiliary board for camera connectors. The main PCB is an 8 layer board, with four power/ground planes and four routing layers, while the auxiliary board is a four layer board with two power/ground planes. The two boards are interconnected with an 18 way flat flex cable (FFC). All components are housed in a black anodized machined aluminum enclosure.

The TG-X200 system (10) utilizes four Texas Instruments TVP5150 video decoders (22A, 22B, 22C, 22D), which accepts Composite Video (CVBS) NTSC (J, M, 4.43), PAL (B, D, G, H, I, M, N, Nc), or SECAM (B, D, G, K, K1, L) Composite Video Inputs, and converts it to digital component video format, ITU-R BT.656.

Figure 2:
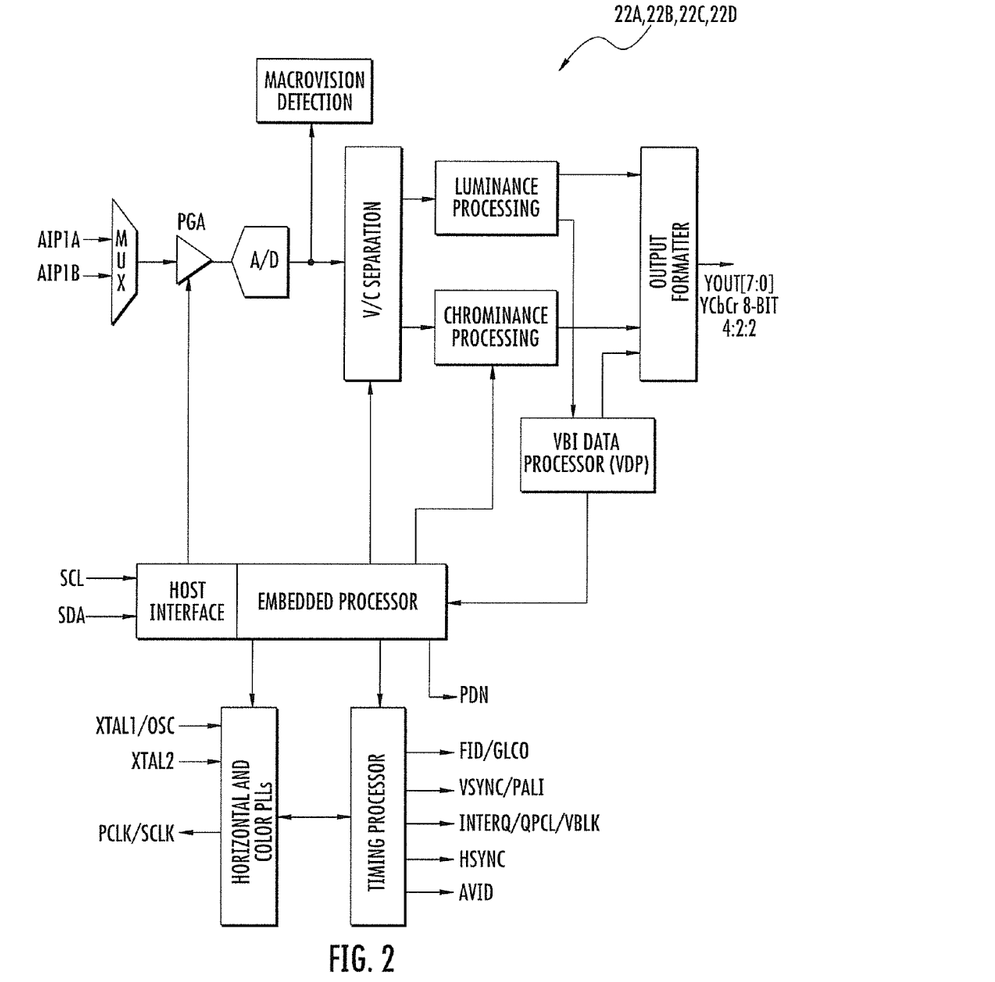
FIG. 2 is a functional block diagram of a video decoder in keeping with the teachings of the present invention.
Figure 3A:
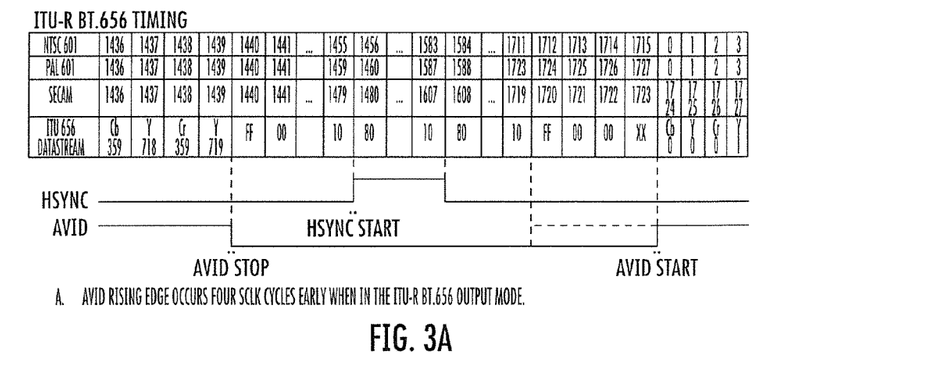
FIG. 3A and FIG. 3B are time line diagrams illustrating an ITU-R BT.656 signal timing.
Figure 3B:
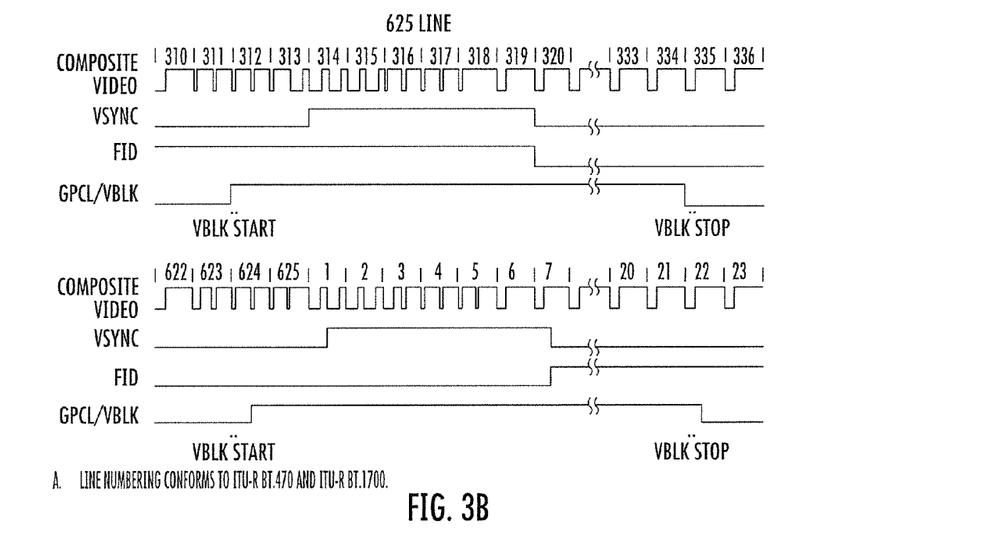

The video decoders (22A, 22B, 22C, 22D), Model TYP5150, each have one 9-bit Analog to Digital Converter (ADC) with 2× sampling. The sampling is done in compliance with ITU-R BT.601, 27 MHz (generated from a 14.31818 MHz crystal oscillator input). FIG. 2 is a functional block diagram of the video decoders (22A, 22B, 22C, 22D). The output format is 8-bit ITU-R BT.656 with embedded synchronization. The out interface has an 8-bit data bus and a clock, where every rising edge of the clock indicates valid data on the data bus. The clock output is used to clock-in the data into the sync processor modules (30A, 30B, 30C, 30D). FIG. 3A and FIG. 3B illustrate the ITU-R BT.656 signal in signal timing diagrams. The industry standard I2C serial interface 68 is used to setup the video decoders (22A, 22B, 22C, 22D) and to adjust characteristics, such as hue, brightness, saturation, sharpness, and the like.

The data stream from the video decoders (22A, 22B, 22C, 22D) includes embedded sync codes. These embedded sync codes are used to indicate Start Active Video (SAV), End Active Video (EAV), and Vertical/Horizontal Blanking. The sync processor logic modules (30A, 30B, 30C, 30d) each use these codes to extract active video. The video decoders (22A, 22B, 22C, 22D) are setup to automatically detect the color system being used (NTSC/PAL/SECAM, by way of example). Although not used in the TG-X200 system (10) herein described by way of example, the video decoders do support Tele-Text, Closed Captioning and Macrovision™ copy protection.

Figure 4:
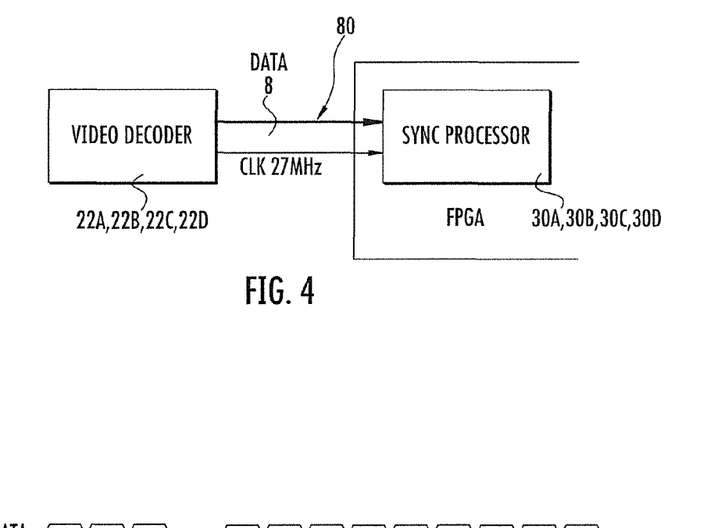
FIG. 4 is a diagrammatical block diagram illustrating data flow from a video decoder to a sync processor module according to the teachings of the present invention.
Figure 5:
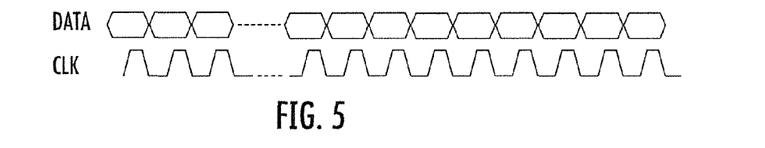
FIG. 5 illustrates a video decoder interface timing diagram in keeping with the teachings of the present invention.

With reference again to FIG. 1 and now to FIG. 4, data from the video decoders (22A, 22B, 22C, 22D) are fed into the sync processor logic modules (30A, 30B, 30C, 30D), as above described, and are done so via an 8-bit data bus and a clock output interface (80), as illustrated with reference to FIG. 4. Valid data are available and clocked-in to the sync processor logic modules (30A, 30B, 300, 30D) on every rising edge of the Clock (CLK). Reference is made to FIG. 5, by way of example, to illustrate the video decoder interface timing signal.

The TG-X200 system (10) uses a 400K gate, 256 pin Xilinx Spartan 3A field programmable gate array (FPGA) (11) to control the system (10). As above described, there are several modules implemented in the FPGA (11) to handle different tasks. The FPGA (11) also coordinates other modules, to provide seamless operation. The FPGA (11) runs from an 80 MHz system clock. It also uses clock signals from other modules to clock-in and clock-out data.

As above described with reference to FIG. 1 for the system (10), consider specific components herein described by way of example for the TG-X200 system (10). As above described, four separate sync processor logic modules (30A, 30B, 30C, 30D) are incorporated to handle the four video channels (28A, 28B, 28C, 28D). The input data is clocked-in via the 8-bit data bus of each video decoder (22A, 22B, 22C, 22D) into the corresponding sync processor logic modules (30A, 30B, 30C, 30D). Two sync processor modules on channels 1 and 3 are dedicated monochrome processors, where the other two are dedicated to color processors. The sync processor modules extract the active video data from the data stream, discarding all data not necessary for ALPR applications.

By way of example for one extraction process, consider use of the system (10) for a PAL standard, wherein each Line in the PAL video frame consists of 1716 bytes of data, of which, 1440 bytes are pixel data (from 0 to 1440 bytes after SAV) and 275 bytes of blanking data, as illustrated with reference again to FIGS. 3A and 3B. The 275 bytes of blanking data is removed from the data stream, which equates to 158400 bytes (275*576). Each Frame includes two video fields (odd field and even field). Each odd field contains 22 blanking lines before and 2 blanking lines after active video. Each even field contains 23 blanking lines before and 3 blanking lines after active video. The Blanking lines do not represent valid data in the digital domain, unless special features such as Tele-Text or Closed Captioning is used. Total of 49 Lines out of 625 lines present in the data stream is removed by the sync processor. This equates reduction of 84084 bytes (1716*49) per frame. After eliminating the blanking data from the frame, each frame contains 829440 bytes (1440*576), where the raw frame contains 1072500 bytes (625*1716). The reduction of data per frame equates to 22.6% (829440/1072500*100%). With 25 Frames per second on each video channel, this in turn produces an effective data rate of 20,736,000 Bytes/Sec (Approximately 20 MB/S) per video channel.

Further, the sync processors (30A, 30B, 30C, 30D) will remove color information from the dedicated monochrome channels, reducing the data rate by half, to about 10 MB/S for Monochrome channels, making the effective Data rate from all four vide decoders is approximately 60 MB/S.

Figure 6:
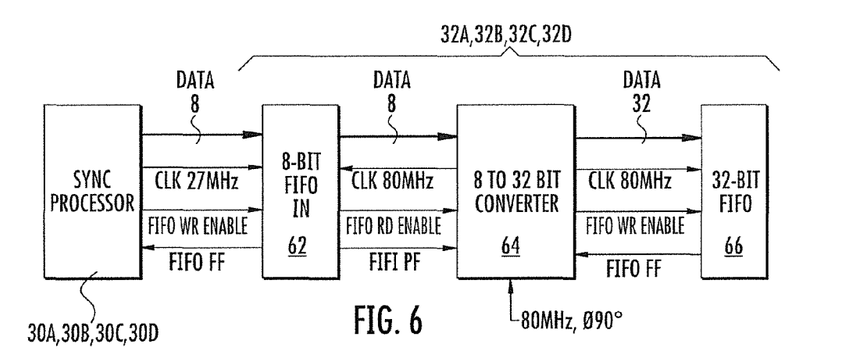
FIG. 6 is a block diagram illustrating data flow from a sync processor to a FIFO module through an 8-bit FIFO module and 32-bit converter for an embodiment of to present invention.

With reference again to FIGS. 1 and 6, the Input FIFO (IN FIFO) modules (32A, 32B, 32C, 342D) each contains a 16 Byte 8-bit FIFO, 8-bit to 32-bit converter and a 32-bit FIFO with 1024 32-bit entries. As herein illustrated, there is an Input FIFO module (32A, 32B, 32C, 32D) for each of the video channels (28A, 28B, 28C, 28D). If the 8-bit FIFO is not full (Indicated by FIFO FF), 8-bit Data from each Sync Processor is clocked in to the 8-bit FIFO using the 27 MHz Clock derived from the CLK output of the Video Decoder. FIFO Enable for the 8-bit FIFO is controlled by the Sync Processor, is asserted only when the needed data is present on the input data bus. The sync processor modules (30A, 30B, 30C, 30D) also preload the 8-bit FIFO modules (32A, 32B, 32C, 32D) with control codes for at Frame Start, Line End and Frame End to help the host computer to re-assemble the Video Frame. A FIFO Programmable Flag (FIFO PF as illustrated in FIG. 6) of the 8-bit FIFO is asserted when the 8-bit FIFO has at least 4 bytes. Once the FIFP PF is set, the 8 to 32 bit converter (64) clocks out 4 bytes from the 8-bit FIFO and packs them in to a 32-bit register. If the 32-bit FIFO is not FULL, the 32 bit value is clocked in to the 32-bit FIFO. The converter (64) runs from an 80 MHz clock, which is 90° phase shifted from Main Clock to make the FIFO properly synchronized with the DDR Memory controller (34). 90° phase shifted clock is generated via a Digital Clock Manager (DCM) block in the FPGA (11).

Figure 7:
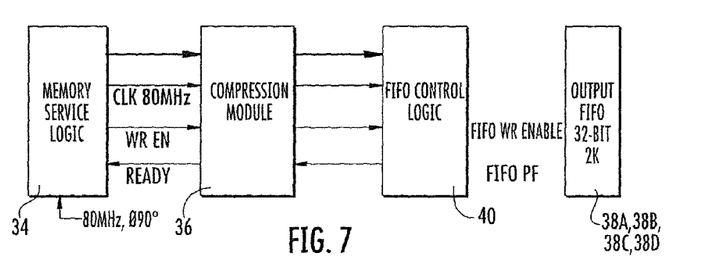
FIG. 7 is a block diagram illustrating an output FIFO and control logic according to the teachings of the present invention.

With reference again to FIG. 1 and now to FIG. 7, memory service logic of the logic controller (34) transfers data to and from the DDR Memory module (60). The memory controller (34) serves the four IN FIFO and the four Out FIFO modules through the compression module (36) in a "round-robin" fashion. Data from each video channel goes in to a separate bank in the memory. The memory acts as a circular buffer, providing a 3 second buffer for a monochrome channel and a 2 second buffer for a color channel. Data from IN FIFO modules are transferred into DDR memory once the word count flag of the IN FIFO modules is equal to or greater than 132. Once a data transfer begins, it is not terminated until the word count flag count falls to 16. Data is transferred from the DDR memory into the OUT FIFO modules until the word count flag is equal to or greater than 1536.

The DDR Memory Interface transfers data at a rate of 320 MB/s, transferring 2 bytes for both rising and falling edge of 80 MHz Clock. The transfer rate can be increased up to 600 MB/s by using a 150 MHz clock, however, is kept at 80 MHz to reduce unnecessary power usage.

The compression module pulls data from the Memory module, for each channel and compresses data and send to the Out FIFO for the particular channel. The compression algorithm runs from a 320 MHz clock, which is derived from the 80 MHz system clock using a Digital Clock Manager Module. See Compression Algorithm section for details.

Each Output FIFO module is a 32-bit FIFO with 2048 32-bit entries. There is an Output FIFO for each video channel. The Output FIFO modules have a Programmable Flag, which is asserted when there is room for at least 128 entries (512 Bytes). When the Memory Service Logic gets its turn for a particular video channel to output data, if the Programmable Flag is set on the Output FIFO for that video channel, the Memory Service Logic will pull 512 bytes of data from the DDR Memory, runs it through the compression module and writes the resultant data to the Output FIFO. Output FIFO Programmable Flag is set to 128 entries (512 Bytes) to make sure it has enough room to fit all data pulled from Memory (512 Bytes) in case the compression is not effective due to the nature of data. The Output FIFO data are clocked in with 80 MHz, Ø90° Clock and the data is clocked out using the 48 MHz Clock from the USB Transceiver, as illustrated with reference again to FIG. 7.

The FIFO Control Logic for (a particular video channel) checks the Programmable Flag (PF) of the Output FIFO to check if the FIFO has enough room to fit at least 128 entries (512 Bytes). If the PF is set, the FIFO Control Logic passes the state of the PF to the Compression Module. If the compression Module is idle, it would assert the READY signal to the Memory Service Logic, indicating it is ready to accept the next chunk of data for compression.

When the memory service logic (34) gets its turn for the particular video channel, it pulls 512 bytes of data from the Memory and sends it to the compression module. The Compression module compresses the data, and clocks the resultant data to the Output FIFO via the FIFO Control Logic. Since the Output FIFO accepts 32 bit entries, the leftover data, if any after clocking out the last 32-bit entry (up to 3 bytes) will be clocked out with the next cycle. With reference again to FIGS. 1 and 7, and now to FIG. 8, the TG-X200 system (10) uses a Cypress Semiconductor CY7C68013A USB Peripheral Controller as the USB Transceiver (42). The CY7C68013A has an 8051 based micro controller and up to 4 Endpoint FIFOs. The USB Transceiver (42) is used in the FIFO Mode, where the 8051 microcontroller is used to do the initial configuration to setup FIFOs and USB device specific initialization. After the initialization, the microcontroller is in idle mode, doing nothing. The USB Transceiver (42) is setup to have 4 USB Endpoints (54A, 54B, 54C, 54D), one for each video channel. Each Endpoint (54A, 54B, 54C, 54D) is configured as a Bulk Endpoint, to ensure the integrity of data and to maximize the bandwidth.

As illustrated with reference to FIG. 8, each Endpoint has a 1 KB FIFO, arranged in a double buffered configuration. The interface (82) to the USB Transceiver (42) is a 16 bit data bus and control/status 10, essentially a FIFO interface, as herein described. All four USB endpoints (54A, 54B, 54C, 54D) are uni-directional, from the system (10) to the host computer (20). The USB Endpoint Controller (44) writes data through the Endpoint FIFO Interface (82).

The Serial Interface Engine (SIE) (58) of the USB Transceiver (42) transfers data between the Endpoint FIFOs (54A, 54B, 54C, 54D) and the host computer (20). It handles all USB communication, including error correction and retries.

Figure 8:
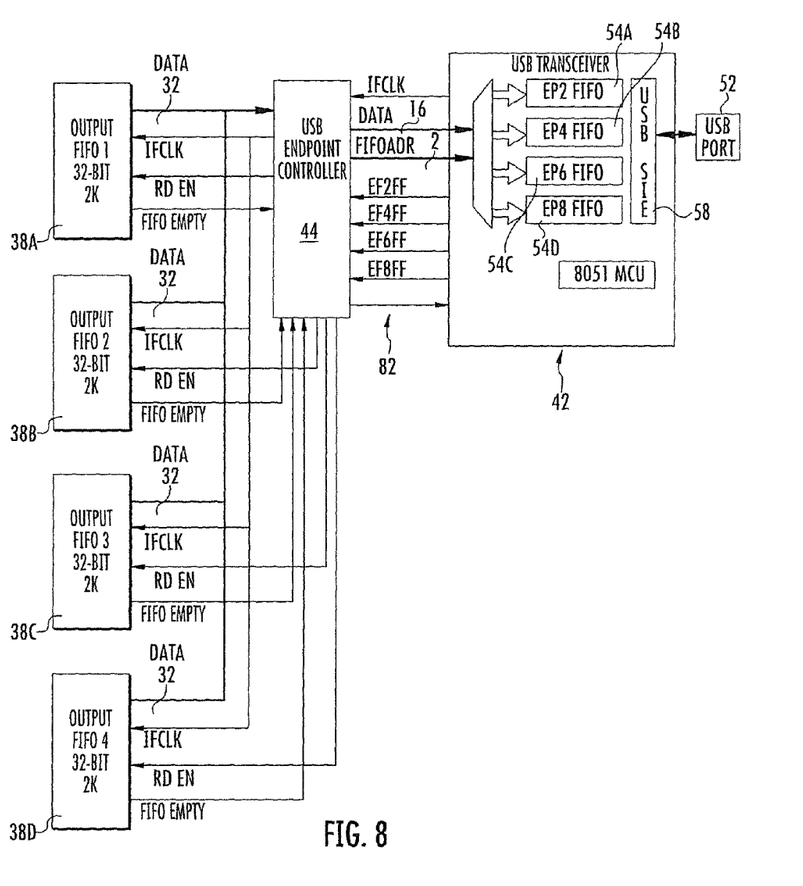
FIG. 8 is a block diagram illustrating one USB transceiver and associated logic in keeping with the teachings of the present invention.

Following are signal descriptions illustrated in FIG. 8 for the USB FIFO Interface (82):
Data[0:15] 16-bit data bus
IFCLK Clock output from USB Transceiver
EP2FF Endpoint 2 FIFO Full
EP4FF Endpoint 2 FIFO Full
EP6FF Endpoint 2 FIFO Full
EP8FF Endpoint 2 FIFO Full
FIFOADR[0:1] Endpoint FIFO Address
SLWR FIFO Write Enable FIFO Full signals for all endpoints (54A, 54B, 54C, 54D) are configured to assert when there is room for one entry in the FIFO. When the FIFO Full signal resets, there is always room for two or more entries in the corresponding FIFO.

With continued reference to FIG. 8, the USB Endpoint Controller (44) transfers data from the Output FIFO modules (38A, 388, 38C, 38D) to the USB Endpoint FIFOs (54A, 54B, 54C, 54D), in the USB Transceiver (42). The endpoint controller (44) uses the 48 MHz clock provided from the USB Transceiver (42) to perform operations. The Endpoint controller (44) goes in a round-robin fashion to serve each video channel ((28A, 28B, 28C, 28D).

Figure 9:
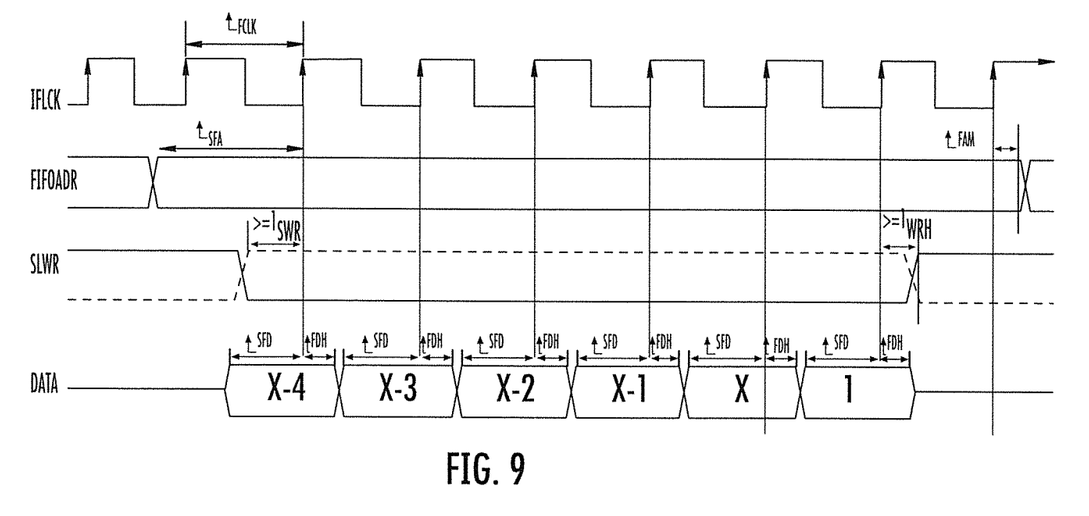
FIG. 9 is a timing diagram illustrating USB FIFO interface timing.

By way of example, and with reference to FIG. 9, the following steps are performed to transfer data from the Output FIFO modules (38A, 38B, 38C, 38D) to the FIFO Endpoints (54A, 54B, 54C, 54D).
1. Set FIFOADR signals to select the Endpoint FIFO for the particular video channel;
2. Check the Endpoint FIFO Full signal (EPxFF) of the selected Endpoint FIFO;
3. If FIFO FULL is set, jump to step 1, and perform the operation for next channel;
4. Check FIFO Empty signal from the respective Output FIFO; if FIFO is Empty, return to step 1 and perform the operation for next channel;
5. Set SLWR Low to indicate Write Cycle;
6. Pull one 32-bit entry from the Output FIFO;
7. Place the Least Significant 16 bits of the 32 bit entry on the Endpoint FIFO data bus on the falling edge of the CLK signal; the data is transferred into the FIFO on the next rising edge of the CLK signal;
8. Place Most Significant 16 bits of the 32 bit entry on the Endpoint FIFO data bus on the next falling edge of the CLK signal; the data is transferred into the FIFO on the next rising edge of the CLK signal; and
9. Return to Step 2.

As above described, in addition to the 4 channel video interfacing, the system (10) has a built in 2 channel USB to Serial converters. The USB2512i hub controller (46) from SMSC is built in to allow the USB transceiver (42) and the USB to Serial interface (68) to be on the same USB port. The USB2512i hub controller (46) provides one USB uplink port (48) and two USB downlink ports (50), while supporting a mix of High Speed and Full Speed USB devices on downlink, without compromising speed.

The USB to dual RS232 converter (70) (a FT2232DR from FTDI), provides the two RS232 ports (70A, 70B) wired to the two ALPR cameras (14, 16), which provide a means for configuring the ALPR cameras without having to connect external RS232 cable to the host computer (20). Also, this eliminates the need for an RS232 port on the host computer (20) to configure the ALPR cameras (14, 16), thus providing an All-In-One ALPR Camera Interface.

Figure 10A:
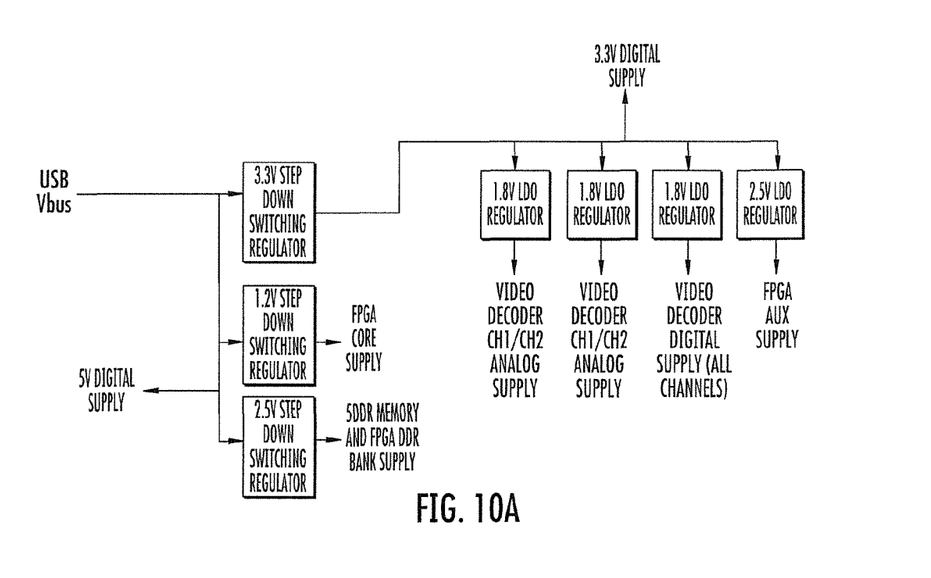
FIG. 10A and FIG. 10B are block diagrams illustrating functions of one embodiment of a power management module in keeping with the teachings of the present invention.
Figure 10B:
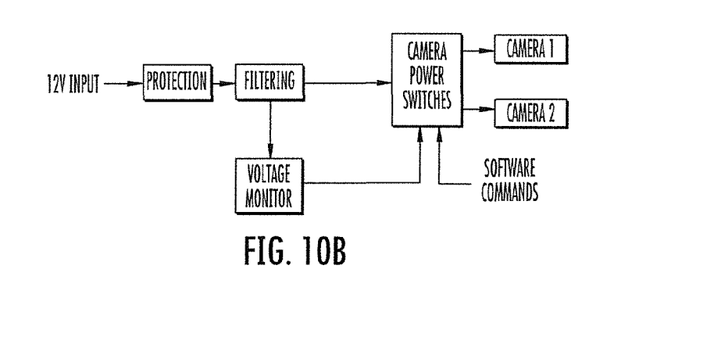

With reference again to FIG. 1 and the power management electronics (72), the TG-X200 electronics run from the 5V power supply provided on the USB port. A separate auxiliary 12V power supply is connected to the system (10) to power the ALPR cameras (14, 16) should USB power not be adequate to meet the ALPR Camera power demands. Power supply is very demanding due to the mixed nature of analog and digital electronics. To accommodate this, the power management electronics (72) has several independent power regulators (79) to cater each need as illustrated with reference to FIGS. 10A and 10B. As above described, the 12V DC input for the cameras (14, 16) is sent through a protection block (78), to protect from over voltage, reverse polarity and transient voltages. A separate protection block may be used for the camera supply. A filtering module will minimize electromagnetic interference and improve immunity characteristics of the system. A separate filtering module is preferably used for the camera supply.

Camera power can electronically be switched ON/OFF via software commands from the host computer. The voltage monitoring circuitry, which monitors the 12V supply and turns off cameras if the voltage drops below a pre-determined level (can be programmed via host computer) to prevent excessive battery drainage in case if the system is running from a battery. A 3.3V supply with 0.5 A capacity is regulated from the 5V supply (from USB) using a Micrel Semiconductor MIC38300 Switcher/LDO regulator. The Switching and LDO (Low Drop Out) regulator hybrid generated cleaner supply with better efficiency. This 3.3V supply is used to provide power to all 3.3V needs on the TG-X200, and to power few remaining low voltage regulators. 1.2V and 2.5V supplies are regulated from the 5V supply. The 1.2V supply powers the FPGA Core and the 2.5V supply powers the DDR Memory module and the associated IO bank in the FPGA. A Toshiba TB7101 series switching regulators are used for these two supplies. Two 1.8V supplies are regulated from 3.3V supply, using Texas Instruments TPS79318 LDO regulators. These power the analog supply of the Video decoders, channels 1 and 2 from one regulator, and channels 3 and 4 from the other. Since the video from each ALPR camera (Mono and Color channels) are synchronized together, one regulator for the channels associated with each ALPR camera minimizes the interference, if any. A 1.8V supply is regulated from 3.3V supply, using a National Semiconductor LP38692MP-1.8 LDO Regulator. This supply powers the Digital 1.8V supply for all video decoders.

Figure 11:
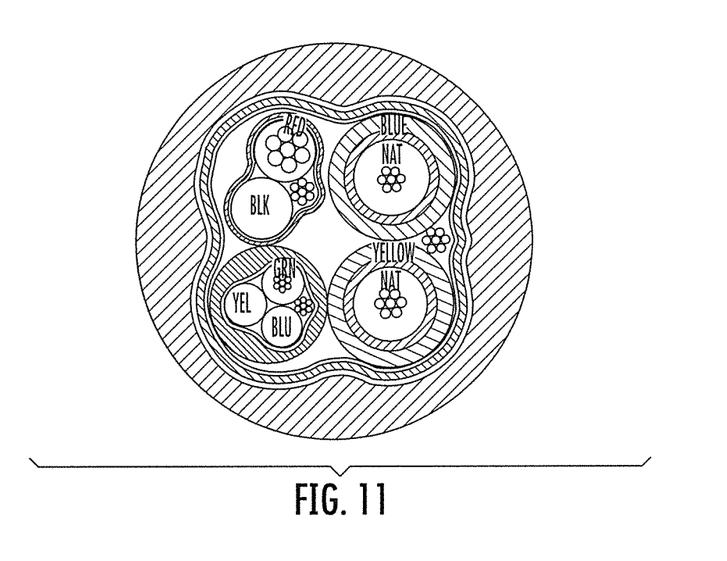
FIG. 11 is a diagrammatical cross sectional illustration of one TG-X200 multi conductor cable; and Table 1 illustrates one connector pinout schedule for the cable of FIG. 11.

By way of further example for the TG-X200 system (10) herein described, a power connector for the system (10) is a locking DC Jack, with a mating plug. The connector has current carrying capacity of 5 A, and rated to 125V. The USB connector is a standard USB B type. A good quality USB cable can be used provided the cable supports USB High Speed standard. The ALPR cameras are connected to the system (10) via a 12 pin shielded circular connector with a metal housing, made by Binder-USA. The camera connector provides all necessary connections for the camera to be fully functional. TG-X200 cable is a multi conductor cable. The two video sources are fed through two coaxial cables. The RS232 signals are on a triad, with a shield (aluminum foil), drain and PVC jacket. Power wires are on a twisted pair, with a shield (aluminum foil), and a drain. The overall cable is shielded with a braid and an aluminum foil, with a drain wire and jacketed with TPE, as illustrated with reference to FIG. 11 for cable and to Table 1 for pinout connections.

The above referenced compression software compresses video data with a minimum resolution loss. The software is adapted to look ahead for a pre-determined amount of data in the data stream, to recognize a repetition of consequent data. If a repetition is not recognized, then the algorithm would make minor changes in the data stream to create a repetition, without destroying the ability for ALPR to operate. If a repetition could be established, it would add the value of the repeated data and number of repetitions as a code, in place of the repeated data values, so that the de-compression algorithm in the PC can decode the data without a significant loss.

By way of example, the following are steps involved in the compression, and comprise:

1. When the compression Module is ready, the Memory Service Logic reads 512 bytes of data from Memory into the compression module;
2. A Series of comparators compare the first 16 bytes (trials need to be run to find the best value) of data to see if it can recognize a repetition of the value of first byte (referred as Rv hereafter);
3. Also, it would compare the same data with Rv+1, and Rv−1, if Rv>1 or Rv+2 and Rv+1 if Rv==1 (Video Data values are non zero); this comparison happens in parallel, using multiple comparators to save time;
4. The above three results are combined (using OR Logic) to see if there is a continuous repetition any combination;
5. If a repetition is not found, or the number of repeated characters is less than 4, the first byte is clocked out and the operation jumps to step 2;
6. The most common value within the repetition (Rv, Rv+1, Rv−1 or Rv+2) is treated as the value for the repetition (referred as Vr hereafter);
7. The entire portion of the repetition is omitted from the data stream and a three byte sequence is sent to the Output FIFO instead; the three byte Sequence is defined as follows:
   Byte 1: 0x00, which indicates start of sequence?
   Byte 2: Bit 7 Always 1, which indicates a repetition
   Bit 6:5 Always 0, not used
   Bit 4:0 Represents number of repetitions
   Byte 3: Vr, Value of the repeated character
8. The starting position of the data stream is set to the byte, which is one after the end of repetition and the steps 2 through 7 is repeated until all 512 bytes are processed; and
9. Memory Service Logic is notified to receive the next block of data.

Since the ALPR applications do not reply on subtle changes on the data stream to do the plate recognition, this minor modification does not reduce the accuracy. In a typical video stream, the data rate can be reduced by about 40-50%, which drops the data rate below the 40 MB/s USB Bandwidth. Further, if the amount of data in the memory buffer increases or remains at a higher value over a long period of time, this would indicate either the PC has become busy or the USB bandwidth has reduced due to some reason. If the amount of data in the buffer continues to increase, this would lead to a loose consecutive frames after the memory buffer becomes full.

In an ALPR system, a License plate normally appears in more than one consecutive frame during its travel across the camera's field of view. However, if several consecutive frames are lost, due to memory buffer being full, it would lead to completely missing a plate. To prevent this, the system (10) has an adaptive frame rate control to prevent the memory buffer getting full. The sync processors (39A, 30B, 30C, 30D) will start dropping frames at once every so many frames, depending on the level of memory usage for either channel for a particular ALPR camera. For Example, if the memory is 50% full on monochrome or color channel for ALPR Camera 1, it will drop every 25th Frame (on both monochrome and respective color channel from the ALPR Camera. Whereas, if the memory is 75% full, it would drop every 15th Frame.

As above discussed, the monochrome and color video in each ALPR camera (14, 16) is synchronized with each other. However, when the video data gets to the computer, and processed to identify a license plate, depending on the load on the computer, it would become non-synchronized. The TG-X200 would mark the monochrome channel data and color channel data with an incrementing index to tag them with the same Frame ID. In this way, the processing software in the PC can re-align the monochrome and color video after processing the plate, regardless of the order of data arrival. This will ensure the color overview image and the monochrome recognition images are taken at the same time, and show the same vehicle.

Many modifications and other embodiments of the invention will come to the mind of one skilled in the art having the benefit of the teachings presented in the foregoing descriptions and the associated drawings and photos. Therefore, it is to be understood that the invention is not to be limited to the specific embodiments disclosed, and that modifications and alternate embodiments are intended to be included within the scope of the claims supported by this specification.

That which is claimed is:

1. A video signal processing system (10) for receiving video feeds (12A, 12B, 12C, 12D) from automatic license plate recognition (ALPR) cameras (14, 16) and for providing a single USB connection (18) to a host computer (20), the system (10) comprising:
    video decoders (22A, 22B, 22C, 22D) adapted to accept video signal inputs (20) from the ALPR cameras (14, 16) and convert the video signal inputs (20) into digital component video formatted outputs (22) in video channels (28A, 28B, 28C, 28D);
    sync processor logic modules (30A, 30B, 30C, 30D) communicating with the video channels (28A, 28B, 28C, 28D), wherein input data provided thereby is clocked-in via each video decoder (22A, 22B, 22C, 22D) into a corresponding sync processor logic module (30A, 30B, 30C, 30D), and wherein the sync processor logic modules (30A, 30B, 30C, 30D) extract active video data from a data stream and discard non-active data unnecessary for ALPR applications;
    input FIFO modules (32A, 32B, 32C, 32D) for each of the video channels (32A, 32B, 32C, 32D), wherein each input FIFO module (32A, 32B, 32C, 32D) is controlled by one of the sync processor logic modules (30A, 30B, 30C, 30D) when the active video data is present;
    a memory controller (34) operable for receiving data from the input FIFO modules (32A, 32B, 32C, 32D);
    output FIFO modules (38A, 38B, 38C, 38D) operable for determining if there is sufficient available data storage and operable with the memory controller (34) for providing data for a particular video channel (28A, 28B, 28C, 28D);
    a compression module (36) receiving data from the memory controller (34) for each of the video channels (32A, 32B, 32C, 32D) and adaptable for storing software instruction for compressing the data sent to the output FIFO modules (38A, 38B, 38C, 38D) for each video channel (32A, 32B, 32C, 32D), wherein the memory controller (34) serves the output FIFO modules (38A, 38B, 38C, 38D) through the compression module (36);
    a FIFO control logic module (40) operable with each video channel (32A, 32B, 32C, 32D), the FIFO Control logic module (40) adapted to determine if the output FIFO modules (38A, 38B, 38C, 38D) have sufficient storage space for a preselected set of data entries, wherein the compression module (36) compresses the data and transmits resultant compressed data to the output FIFO modules (38A, 38B, 38C, 38D) via the FIFO control logic module (40);
    a USB transceiver (42) comprising a microcontroller, wherein the USB transceiver (42) is operable in a first in, first out (FIFO) mode for an initial configuration and setup of the FIFO output modules (38A, 38B, 38C, 38d);
    a USB endpoint controller (44) operable with the USB transceiver (42) for transferring data from the output FIFO modules (38A, 38B, 38C, 38D) to the USB Transceiver (42), wherein data from the Output FIFO modules (38A, 38B, 38C, 38D) is clocked in and clocked out using the USB transceiver (42) operable with the FIFO control logic module (40); and
    a single high speed USB connector (52) connected to the USB transceiver (42), the single high speed USB connector (52) thus providing the single USB connection (18) to the host computer (20).

2. The system (10) according to claim 1, wherein first and third sync processor logic modules (30A, 30C) on first and third channels (32A, 32C) are dedicated to monochrome signal processing, and wherein second and fourth sync processor logic modules (30B, 30D) on second and fourth channels (32B, 32D) are dedicated to color signal processing.

3. The system (10) according to claim 1, wherein the sync processor logic modules (30A, 30B, 30C, 30D) preload the input FIFO modules (32A, 32B, 32C, 32D) with control codes useful to the host computer (20) for reassembling a video frame generated by the ALPR cameras (14, 16).

4. The system (10) according to claim 1, wherein the FIFO control logic module (40) is responsive to a programmable flag of the output FIFO modules (38A, 38B, 38C, 38D) to determine if the output FIFO modules (38A, 38B, 38C, 38D) have sufficient storage space for a preselected set of data entries, and wherein the FIFO control logic module (40) provides a READY signal to the memory controller (34) indicating it is ready to accept data for compression.

5. The system (10) according to claim 1, further comprising a USB Hub Controller (46) to allow the USB transceiver (42) and a 2 channel USB to Serial interface operable therewith to be on one USB port, wherein the hub controller (46) provides one USB uplink port (48) and two USB downlink ports (50).

6. The system (10) according to claim 1, wherein the compression module (36) is adapted to operate with compression software for operation with a 320 MHz clock, which is derived from an 80 MHz system clock using a digital clock manager module.

7. The system (10) according to claim 1, wherein the USB endpoint controller (44) uses a 48 MHz clock provided by the USB Transceiver (42) to perform all operations, and wherein the USB endpoint controller (44) operates in a round-robin fashion to serve each video channel (28A, 28B, 28C, 28D).

8. The system (10) according to claim 7, wherein the microcontroller of the USB transceiver (42) is in an idle mode after initialization, and wherein the USB Transceiver (42) is setup to have 4 USB Endpoints (54A, 54B, 54C, 54D), one endpoint for each video channel (28A, 28B, 28C, 28D), each endpoint configured as a bulk endpoint to ensure integrity of data and to maximize bandwidth, each endpoint having a 1 KB FIFO arranged in a double buffered configuration, wherein an interface (82) of the USB Transceiver (42) is a 16 bit data bus and control/status IO, wherein the interface for all USB endpoint FIFO modules (EP2, EP4, EP6 and EP8) is uni-directional to the host computer (20), wherein the USB Endpoint FIFO Logic Controller (44) writes data through the Endpoint FIFO Interface, and wherein a USB Serial Interface Engine (SIE) (58) of the USB Transceiver (42) transfers data between the Endpoint FIFO modules (EP2, EP4, EP6, EP8) and the host computer (20) for communications therewith.

9. The system (10) according to claim 8, wherein FIFO Full signals for all endpoints are configured to assert when there is room for one entry in the FIFO, and wherein when the FIFO Full signal resets, there is always room for two or more entries in the corresponding FIFO.

10. The system (10) according to claim 1, further comprising a DDR SDRAM module (60), wherein the memory controller (34) includes DDR memory service logic, and wherein the DDR memory service logic transfers data to and from the DDR SDRAM module (60).

11. The system (10) according to claim 10, wherein the memory controller (34) is operable for receiving data from the Input FIFO modules (32A, 32B, 32C, 32D) and transferring the data to and from the DDR SDRAM module.

12. The system (10) according to claim 1, wherein each input FIFO module (32A, 32B, 32C, 32D) contains a 16 Byte 8-bit FIFO (62), 8-bit to 32-bit converter (64) and a 32-bit FIFO (66) with 1032 32-bit entries, wherein if the 8-bit FIFO (62) is not full, 8-bit Data from each Sync Processor (30A, 30B, 30C, 30D) is clocked into the 8-bit FIFO (62) using a 27 MHz Clock derived from a CLK output of the video decoder (22A, 228, 22C, 22D), wherein a FIFO Enable for the 8-bit FIFO is controlled by the sync processor (30A, 308, 30C, 30D) and is asserted only when the active data is present on the input data bus, and wherein the sync processor preloads the 8-bit FIFO with control codes for a Frame Start, Line End and Frame End to support operation of the host computer (20) to re-assemble a Video Frame, wherein a FIFO Programmable Flag of the 8-bit FIFO is asserted when the 8-bit FIFO has at least 4 bytes, and wherein once the FIFO programmable flag is set, the 8 to 32 bit converter clocks out 4 bytes from the 8-bit FIFO and packs them in to a 32-bit register, and wherein if the 32-bit FIFO is not FULL, the 32 bit value is clocked in to the 32-bit FIFO, wherein the converter runs from an 80 MHz clock, which is 90° phase shifted from a main clock to have the FIFO synchronized with a DDR memory controller of the memory service logic (34).

13. The system (10) according to claim 1, further comprising a serial interface (68) adapted to setup the video decoders (22A, 22B, 22C, 22D) and to adjust characteristics including at least one of hue, brightness, saturation, and sharpness.

14. The system (10) according to claim 1, further comprising an RS232 interface (70) communicating with the USB hub controller (46), the RS232 interface (70) having ports (70A, 70B) for connecting to two ALPR cameras (14, 16).

15. The system (10) according to claim 1, further comprising ALPR Camera Power Management electronics (72) controlling power delivered to the system from a power source (74).

16. The system (10) according to claim 15, further comprising a universal serial bus (76) for receiving power from the power source (74) providing a 12V DC supply used to power the ALPR Camera Power Management electronics (72).

17. The system (10) according to claim 16, wherein the 12V DC supply for the cameras is sent through a protection block (78) to protect from at least one of an over voltage, reverse polarity and transient voltages.

18. The system (10) according to claim 1, wherein the compression module (36) comprises a processor adapted to compress video data with a minimum resolution loss, wherein the processor looks ahead for a pre-determined amount of data in a data stream to recognize a repetition of consequent data, and wherein if a repetition is not recognized, the processor modifies the data stream to create a repetition such that de-compression may be completed in the host computer (20) through a decoding of the data.

19. The system (10) according to claim 18, wherein the compression of the video data provided by the processor comprises;
   memory service logic for reading 512 bytes of data from the memory controller (34) into the compression module (36) when the compression module (36) is in a ready state;
   comparators adapted to compare a first 16 bytes of data to determine if a repetition of the value of first byte is recognized (referred as Rv hereafter), wherein the comparators compare in parallel the same data with Rv+1, and Rv−1, if Rv>1 or Rv+2 and Rv+1 if Rv=1 (video data values being non zero), wherein three results are combined using OR Logic to see if there is a continuous repetition any combination, wherein if a repetition is not found or the number of repeated characters is less than 4, the first byte is clocked out and the operation jumps to a next step, wherein the most common value within the repetition (Rv, Rv+1, Rv−1 or Rv+2) is treated as a value for the repetition (referred as Vr hereafter), and wherein the entire portion of the repetition is omitted from the data stream and a three byte sequence is sent to the Output FIFO modules (38A, 38B, 38C, 38D) as appropriate, and wherein the memory controller (34) is notified to receive a next block of data.

20. The system (10) according to claim 1, wherein the compression module (36) comprises an adaptive frame rate controller operable with the memory controller (34).

21. The system (10) according to claim 1, wherein the video signal inputs (24) from the ALPR cameras (14, 16) comprise at least one of Composite Video (CVBS) NTSC (J, M, 4.43), PAL (B, D, G, H, I, M, N, Nc), and SECAM (B, D, G, K, K1, L) Composite Video.

22. The system (10) according to claim 1, wherein each video decoder (22A, 22B, 22C, 22D) comprises one 9-bit analog to digital converter (ADC) with 2× sampling, and wherein data sampling is done in compliance with ITU-R BT.601, 27 MHz (generated from the 14.32222 MHz crystal oscillator input, and wherein the output format is 8-bit ITU-R BT.656 with embedded synchronization, the out interface (80) has an 8-bit data bus and a clock, wherein every rising edge of a clock signal indicates valid data on the data bus, the clock output being used to clock-in the data into the sync processor modules (30A, 30B, 30C, 30D).

23. The system (10) according to claim 22, wherein a signal-in signal timing comprises a data stream from the video decoders (22A, 22B, 22C, 22D) having embedded sync/timing codes used to indicate a start active video (SAV), end active video (EAV), and vertical/horizontal blanking, wherein a sync processor extracts the active video, wherein the video decoder (22A, 22B, 22C) automatically detects a color system being used, and wherein data from the video decoders are fed into a sync processor module (30A, 30B, 30C, 30D), wherein valid data is available and clocked into the sync processor module on every rising edge of a clock signal.

24. The system (10) according to claim 23, wherein each sync processor module (30A, 30B, 30C) employs a PAL standard, wherein each Line in the PAL video frame consists of 1716 bytes of data, of which, 1440 bytes are pixel data (from 0 to 1440 bytes after SAV) and 275 bytes of blanking data, wherein 275 bytes of blanking data is removed from the data stream, which thus equates to 158400 bytes (275*576), wherein each Frame includes two video fields (odd field and even field), each odd field contains 22 blanking lines before and 2 blanking lines after active video, each even field contains 23 blanking lines before and 3 blanking lines after active video, wherein the blanking lines do not represent valid data in a digital domain unless special features are used, wherein a total of 49 Lines out of 625 lines present in the data stream is removed by the sync processor module (30A, 30B, 30C, 30D), thus equating to a reduction of 84084 bytes (1716*49) per frame, wherein after eliminating the blanking data from the frame, each frame contains 829440 bytes (1440*576), and wherein a raw frame contains 1072500 bytes (625*1716), wherein the reduction of data per frame equates to 22.6% (829440/1072500*100%), thus with 25 Frames per second on each video channel produces an effective data rate of 20,736,000 bytes/sec per video channel, and wherein the sync processor module removes color information from the dedicated monochrome channels, reducing the data rate by half, to about 10 MB/S for monochrome channels, making an effective data rate from all video decoders approximately 60 MB/S.

25. The system (10) according to claim 1, wherein the memory controller (34) operates such that data from each video channel (28A, 28B, 28c, 28D) goes into a separate bank of memory, and wherein the memory acts as a circular buffer providing a 3 second buffer for a monochrome channel and a 2 second buffer for a color channel, wherein data from IN FIFO modules (32A, 32B, 32C, 32D) are transferred into DDR memory once a word count flag of the IN FIFO modules is equal to or greater than 132, wherein data are transferred from the DDR memory into the OUT FIFO modules (38A, 38B, 38C, 38D) until the word count flag is equal to or greater than 1536, wherein the DDR Memory Interface transfers data at a rate of 320 MB/s, transferring 2 bytes for both rising and falling edge of 80 MHz Clock.

26. The system (10) according to claim 1, wherein each output FIFO module (38A, 38B, 38C, 38D) is 32-bit FIFO with 2048 32-bit entries, the output FIFO modules having a programmable flag, which is asserted when there is room for at least 132 entries (512 Bytes), wherein when the memory service logic (34) gets its turn for a particular video channel to output data, if the programmable flag is set on the Output FIFO module for that video channel, the memory service logic pulls 512 bytes of data from the DDR memory, runs it through the compression module (36) and writes the resultant data to the Output FIFO modules, wherein the output FIFO programmable flag is set to 132 entries (512 Bytes) for providing room to fit all data pulled from the memory (512 Bytes), wherein the Output FIFO data is clocked in with 80 MHz, Ø90° clock and the data is clocked out using a 48 MHz Clock from the USB transceiver (42).

27. The system (10) according to claim 1, wherein the a USB transceiver (42) operates with the USB endpoint controller (44), the controller having an 8051 based microcontroller and up to 4 endpoint FIFOs, wherein the USB Transceiver (42) is used in a FIFO mode, wherein the 8051 based microcontroller is used for initial configuration, wherein after the initialization, the microcontroller is in idle mode, wherein the USB transceiver (42) is setup to have 4 USB endpoints, one for each video channel (28A, 28B, 28C, 28D), each endpoint is configured as a bulk endpoint to ensure integrity of data and to maximize bandwidth, each endpoint has a 1 KB FIFO arranged in a double buffered configuration, wherein an interface (82) to the USB Transceiver (42) is a 16 bit data bus and control/status 10, wherein all USB endpoints (54A, 54B, 54C, 54D) are uni-directional to the host computer, wherein the USB endpoint controller writes data through the Endpoint FIFO Interface, wherein a serial interface engine (SIE) (58) of the USB Transceiver (42) transfers data between the output FIFO modules (38A, 38B, 38C, 38D) and the host computer (20).

28. The system (10) according to claim 1, wherein data transfer from the output FIFO modules (38A, 38B, 38C, 38D) to the endpoint FIFO logic (44) comprises processor means for providing at least one of at least setting FIFOADR signals to select the Endpoint FIFO for a particular video channel, checking the an Endpoint FIFO Full signal (EPxFF) of the selected Endpoint FIFO, checking FIFO Empty signal from the respective Output FIFO, setting SLWR Low to indicate a Write Cycle, pulling one 32-bit entry from the Output FIFO, placing a Least Significant 16 bits of the 32 bit entry on the Endpoint FIFO data bus on the falling edge of the CLK signal, and transferring the data into the FIFO on the next rising edge of the CLK signal, and placing a Most Significant 16 bits of the 32 bit entry on the Endpoint FIFO data bus on the next falling edge of the CLK signal, the data transferred into the FIFO on the next rising edge of the CLK signal.

29. The system (10) according to claim 1, wherein four video decoders (22A, 22B, 22C, 22D) communicate with four sync processors (30A, 30B, 30C, 30D) operable with four input FIFO modules (32A, 32B, 32C, 32D) through four video channels (28A, 28B, 28C, 28D), and wherein the compression module (36) receives data from the memory controller (34) for the four video channels and provides compressed data to four output FIFO modules (38A, 38B, 38C, 38D).

* * * * *